United States Patent

[11] 3,629,842

[72] Inventor Frank Finley Taylor
Glen Ellyn, Ill.
[21] Appl. No. 33,274
[22] Filed Apr. 30, 1970
[45] Patented Dec. 21, 1971
[73] Assignee Bell Telephone Laboratories, Incorporated
Murray Hill, Berkeley Heights, N.Y.

---

[54] MULTIPLE MEMORY-ACCESSING SYSTEM
20 Claims, 3 Drawing Figs.

[52] U.S. Cl. .......... 340/172.5
[51] Int. Cl. .......... G06f 9/06
[50] Field of Search .......... 340/172.5

[56] References Cited

UNITED STATES PATENTS 3,409,879 11/1968 Keister .......... 340/172.5
3,339,183 8/1967 Bock .......... 340/172.5

*Primary Examiner*—Gareth D. Shaw
*Assistant Examiner*—Ronald F. Chapuran
*Attorneys*—R. J. Guenther and R. B. Ardis

---

ABSTRACT: A memory-accessing system is disclosed which is comprised of a plurality of pairs of memories, a decoder, and an access control means. Identical instruction sets are stored in each memory of a memory pair and consecutive address locations correspond to consecutive memory pairs. The decoder is responsive to memory addresses to select one memory pair for access. The access control means is then operative to select the one memory, of the memory pair selected by the decoder, which was accessed the longest time in the past and to provide a transmission path for the memory address to the selected memory.

INVENTOR
F. F. TAYLOR
BY John C Albrecht
ATTORNEY

MULTIPLE MEMORY-ACCESSING SYSTEM

BACKGROUND OF THE INVENTION

1. Field of the Invention

This invention relates to memory-accessing systems and specifically to such systems which provide access to a plurality of memories.

The performance of the work functions of a data processor is based upon instructions which are generally contained in memories in ordered lists. Instructions are accessed sequentially from these lists to cause the data-processing unit to perform a proper sequence of operations to complete a work function. The data processor generally executes the operation defined by an instruction in a given time interval or data processor cycle. After the execution of an instruction it is ready to start execution on a new instruction at the beginning of the next data processor cycle. It is important, therefore, to provide the data processor with a new instruction at the beginning of each cycle so it does not lose time waiting for instructions. To provide efficient operation, memories which are capable of being accessed each processor cycle, should be used. However, memories which are capable of this rate of operation may not be economical and may not have sufficient storage capacity to provide a worthwhile number of operations. To eliminate this problem arrangements have been developed to provide an effective accessing rate which is equal to the data processor rate by using memories with slower rates.

2. Description of the Prior Art

One such known memory-accessing system provides a plurality of memories with lists of instructions interleaved between these memories. With this system the first instruction of an ordered list is taken from a first memory, the second instruction from a second memory, etc. The subsequent accessing of the second through the *n*th memory allows the first memory sufficient time to become reaccessible before it is addressed at the $n+1$ memory access. Another type of known system uses a data processor which performs operations controlled by integer fraction portions of the instruction word accessed from memory. The data processor operates this integer number of cycles, by selecting portions of the instruction word, before reaccessing the memory. This gives an effectively increased instruction rate by providing the processor with a new instruction for every processor cycle while reaccessing memory only once every given integer number of processor cycles.

The increased rate as provided by these prior art methods is maintained when advancing through a list of instructions. However, in the presence of a transfer or other nonsequential memory access, the interleaved memory system can be required to access a first memory twice in succession thus making the processor wait until that memory is again accessible. Accordingly, valuable processor time is lost. With the second-mentioned prior art system, a nonsequential transfer address may be recognized during the processing for the first integer fraction portion of the instruction. When this occurs the processor must wait for the remaining number of cycles until the memory can be reaccessed.

It is a feature of my invention to provide a memory system capable of transmitting instruction words to a data processor at a rate faster than an individual memory rate and in so doing avoid the time lost due to the occurrence of nonsequential addresses.

SUMMARY OF THE INVENTION

The data-processing system of my invention is comprised of a plurality of memories, a central control and a program control unit. A system using four memories will be described. The memories are divided into two pairs with each memory of a pair containing an instruction set which is redundantly contained in the other memory of the pair. The instruction set of one memory pair is interleaved with the instruction set of the other memory pair. Information is redundantly stored in many memory systems today to provide security against the loss of irreplaceable or slowly replaceable information if one memory should fail. The memories are capable of transmitting na instruction word in response to an address within one data processor cycle but they cannot be reaccessed for two data processor cycles because they require more than one cycle to become reaccessible. It is common in today's technology for rapid access memories to have an access time which is approximately one-half of their reaccess time. In normal operation the data processor will transmit addresses which correspond alternately to the first and then the second pair of memories. The particular memory which is to be accessed is determined by the program control unit. This unit determines the memory pair which corresponds to the address and selects the one memory of that pair which was accessed the longest time in the past. The memory accessed the longest time in the past will be referred to herein as the responsive memory. Addresses are transmitted to the memory system on a common bus and the program control unit enables the input gates of the responsive memory to allow it to receive the address.

When a transfer instruction is interpreted by the central control the outputs of all memories are inhibited to stop the transmission of instructions made irrelevant by the transfer. The transfer address is then transmitted to the memories and the program control unit allows access to the responsive memory of the pair indicated by the address. When the memory pair which contains the instruction which requested this transfer also contains the transfer address, the instruction will come from one of the memories of the pair and the transfer address will be transmitted to the other memory of this pair. In this manner the processor need not wait for a memory to become reaccessible and a minimum of processor time is lost.

BRIEF DESCRIPTION OF THE DRAWING

The invention will be more readily understood from the following description when read with respect to the drawing therein.

DESCRIPTION OF THE PREFERRED EMBODIMENTS

Figure 1:
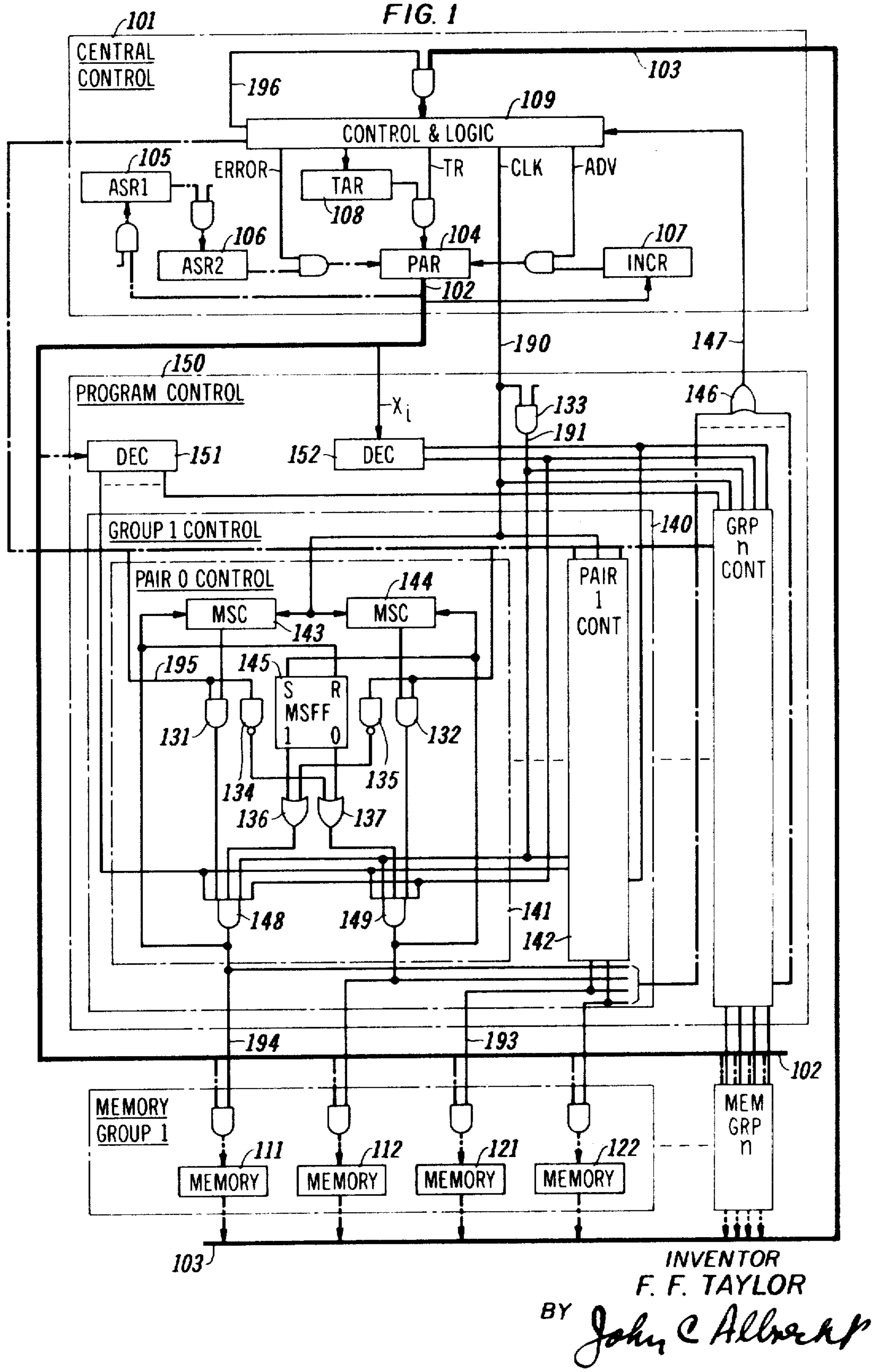
FIG. 1 is a schematic diagram of an illustrative embodiment of my invention.

The processing system shown in FIG. 1 is comprised of a plurality of memories 111, 112, 122, etc., a central control 101, a program control unit 150 and buses for intercommunication between the system elements. Central control 101 of this example is capable of interpreting instructions and performing operations in response to them at a rate of one every ½*t* microseconds. The time for transmission of an address by central control 101 to the receipt of the information stored by the memory system at that address is somewhat less than ½*t* microseconds. However, as is the case with many rapid access memories, an individual memory which has been accessed cannot be reaccessed until some time later than the next data-processing cycle. Therefore, the memory accessed must wait until the second following data processor cycle to be reaccessible.

The memories of this system are divided into groups of four. The groups are further divided into pairs with a first pair, such as memories 111 and 112 of the first group, redundantly containing a first set of instructions which is interleaved with a second set of instructions redundantly contained in a second pair of memories of the same group such as memories 121 and 122. Ordered lists of instructions for the performance of related operations are normally stored within one group of memories. Addresses are transmitted to the group at a rate of one every ½*t* microseconds which correspond alternately to the first memory pair and the second memory pair; e.g., for the first group, addresses are transmitted alternately to memory pair 111 and 112 and memory pair 121 and 122. These addresses are transmitted over bus 102 when they are placed in the program address register 104. They are thus applied to the inputs of all the memories with access to the correct memory being provided by the program control unit 150.

The program address register 104 contains the addresses which are to be sent to the instruction memory system. A portion of the most significant address bits of the program address register 104 are transmitted to the decoder 151 of the program control unit 150 to determine which group of four memories is being addressed. One of the least significant bits, called the bit $X_i$ of the program address register 104 is transmitted to decoder 152 of the program control unit 150 to determine which pair of memories within the selected group is to be accessed. The decoders 151 and 152 are responsive to their input signals to apply a logical "1" to the appropriate group control unit and the appropriate pair control unit within the selected group respectively.

Prior to the transmission of the contents of the program address register 104 to the appropriate memory it is transmitted, under the control of the control and logic unit 109 of the central control, to the auxiliary storage register 105 and the incrementing circuit 107. When the next address is gated to the memory system the contents of the auxiliary storage register 105 is gated to the second auxiliary storage register 106 and the new address is gated to the auxiliary storage register 105. The auxiliary storage registers are used to maintain a record of the last addresses sent to the memory system. System timing, as controlled by the control and logic unit 109 of the central control, is such that if a memory reply is found to be erroneous, by error detection circuitry (not shown) within the central control unit 109, the address for that location is stored in auxiliary storage register 106. This address, in response to the presence of an error condition, will be transmitted to the program address register 104 to readdress the memory system.

The program address register 104 is provided with three sources of addresses. One source is the output of the auxiliary storage register 106 as used for readdressing the memory when an erroneous reply has been received by central control 101. When advancing through a list of instructions, program address register 104 receives addresses from the incrementing circuit 107. The addresses received from this course are the previous addresses incremented by one of the $X_i$ position. The incrementing circuit 107 provides the change of address required to maintain the interleaved accessing of the memories. The third source of addresses is the transfer address register 108. This register contains addresses to be used if a transfer is to be initiated. The gating of the contents of the three indicated sources to the program address register 104 is accomplished in response to control signals which are generated by the control and logic unit 109.

As indicated above, the contents of the program address register 104 is used to determine which instruction list, i.e., which pair of memories, is to be accessed. The selection of the proper memory of the pair requested by the address is controlled by the program control unit 150. The program control unit 150 is divided into as many group control units as there are groups of memories with two pair control units, such as pair control units 141 and 142, per group. Associated with each pair control unit is a memory state flip-flop; e.g., in pair control unit 141 the memory state flip-flop 145. The state of the flip-flop 145 indicates which memory within the pair was accessed the longest time in the past. As before, a memory accessed the longest time in the past will be referred to as the responsive memory. Associated with each memory is a two-state counter such as counters 143 and 144 which correspond to memories 111 and 112 respectively. The output of the memory state counter 143 and the memory state flip-flop 145 output which corresponds to memory 111 are combined with other control information in output AND-gate 148 and the output of memory state counter 144 and the output of memory state flip-flop 145 which corresponds to memory 112, are combined in output AND-gate 149. The outputs of memory state counters 143 and 144 are transmitted via gates 131 and 132 respectively. These AND gates are primarily held in the enabled condition and are used for maintenance purposes to be discussed later herein. Equivalent combinations also occur in the other pair control units.

Clock pulses are transmitted via conductor 190 at ½t microsecond intervals at the end of each data-processing cycle. These clock pulses are delivered via AND-gate 133, which for this example is considered continuously enabled, to the output AND gates of all the pair control units. These clock pulses cause gating pulses to be transmitted to their respective memory of the memory pair selected by the decoders 151 and 152. Each memory responds to the addresses received by it to select the information word stored at the location defined by the address and to transmit that information word to the control and logic unit 109 via bus 103. A memory state counter is activated when its associated memory is accessed and upon activation its output changes from the logical "1" state to the logical "0" state. The activation allows the memory state counter to receive subsequent clock pulses via conductor 190 from the system clock (not shown) of the central control 101 causing the counter to be reset at the end of the next data processor cycle. The reset of the memory state counter causes it to indicate that its associated memory is again accessible.

For the purposes of illustration, the program address register 104 contains an address for memory pair 111 and 112, memories 111 and 121 are the responsive memories of their respective pairs and no memory has been accessed for several cycles. Decoder 151 in response to the address in the program address register 104 applies logical ones to AND-gates 148 and 149 of the pair control unit 141 and the corresponding AND gates (not shown) as contained in pair control unit 142. Decoder 152 in response to bit $X_i$ applies a logical "1" to AND-gates 148 and 149 of the pair control unit 141 and a logical "0" to the corresponding AND gates (not shown) of the pair control unit 142. In this manner the decoders 151 and 152, in response to the contents of the program address register 104, select the pair of memories defined by the address. Since neither memory of this pair has been accessed for several cycles the memory state counters 143 and 144 both apply logical "1" to their respective output AND-gates 148 and 149 but the memory state flip-flop 145 applies a logical "1" via OR-gate 146 only to the output AND-gate 148. This application of a logical "1" to output AND-gate 148 by the memory state flip-flop 145 indicates that memory 111 is the responsive memory. At the end of each data processor cycle a clock pulse is transmitted via conductor 190, AND-gate 133 and conductor 191 from central control 101 to the output AND gates of all of the group control units. When the clock pulse for this cycle is transmitted AND-gate 148, as selected by the decoders 151 and 152 and the pair control unit 141, will deliver a gating pulse to memory 111 via conductor 194 allowing its receipt of the address as contained in the program address register 104. The gating pulse from AND-gate 148 is also transmitted to memory state counter 143 and to the memory state flip-flop 145. In response to the gating pulse, the memory state counter 143 is changed to the activated condition indicating that memory 111 cannot be accessed and the memory state flip-flop 145 is changed to indicate that memory 112 is the responsive memory of the first pair.

When advancing through an instruction list the address in the program address register 104 is incremented by the incrementing circuit 107, under the control of the control and logic unit 109, and the newly incremented address is placed in the program address register 104. Due to interleaved memory-accessing arrangement the second address of this example corresponds to memory pair 121 and 122. Pair control unit 142, in response to the conditions of its elements and the address as contained in the program address register 104, is operative to select memory 121 for access. When the clock pulse is delivered, at the end of this cycle, to the output AND gates, the resulting gating pulse on conductor 193 is also delivered to the memory state counter corresponding to memory 121. The clock pulse which initiates the gating pulse is also transmitted to memory state 143 which returns it to the nonactivated state indicating that it can be reaccessed.

The operation of this system when a transfer occurs is substantially as indicated above. The control and logic unit 109 determines that a transfer is to be initiated and transmits a countermand signal via conductor 196 which causes any response made irrelevant by the transfer to be inhibited. The contents of the transfer address register 108 is gated, under the control of the control and logic unit 109, to the program address register 104. The transfer address is not in sequence with the interleaved addresses that have been generated by the incrementing circuit 107 and it is possible that the transfer address corresponds to the same memory pair which was accessed on the previous cycle. By providing access to the responsive memory of this memory pair an available memory is assured.

Figure 2:
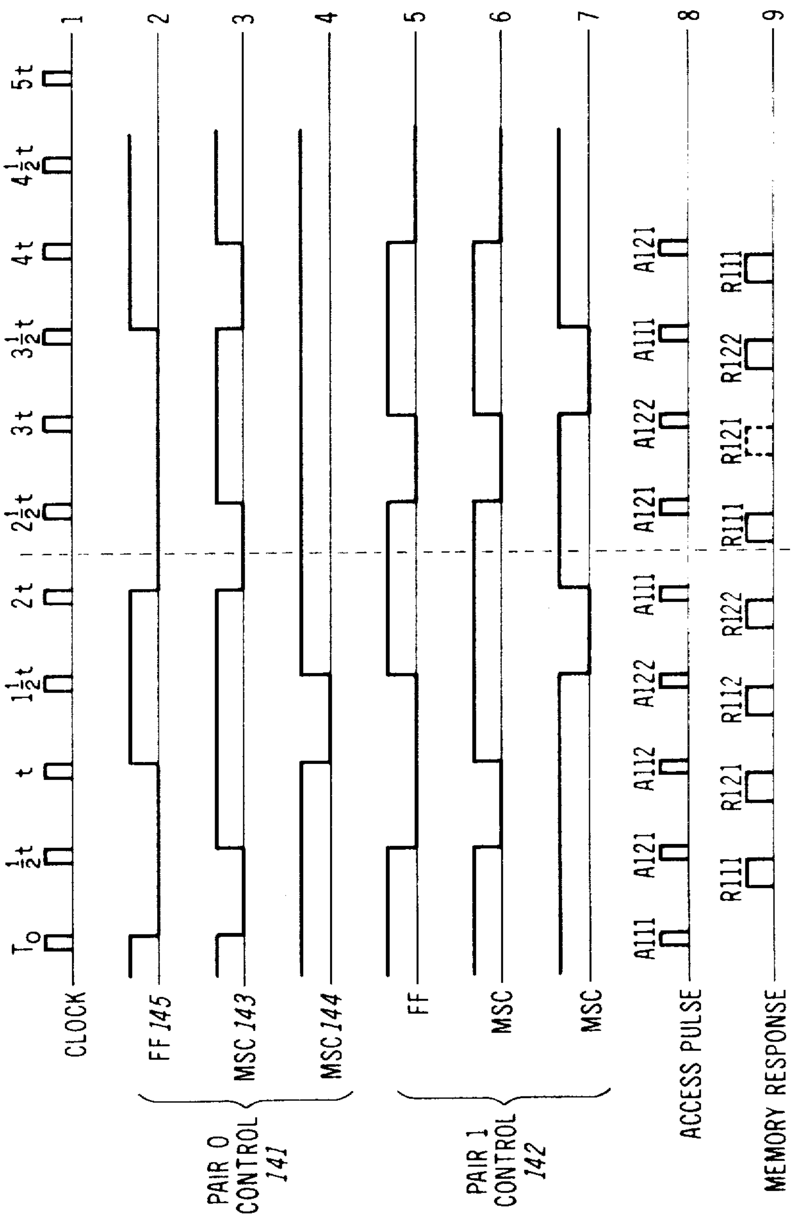
FIG. 2 is a timing diagram for a processor operating at twice the memory reaccess rate.

FIG. 2 is a timing diagram showing the sequence of operations described in the previous section. The initial conditions are the same as are indicated in that example. These conditions are that the program address register 104 contains an address corresponding to the memory pair 111 and 112, memories 111 and 121 are the responsive memories of their respective pairs and no memory has been accessed for several cycles. The memory state counters 143 and 144 of the first pair of memories are in the logical "1" state indicating that either memory can be accessed. However, memory state flip-flop 145, as shown by the logical "1" on line 2 indicates that memory 111 is the responsive memory. A clock pulse at $T_0$, causes the generation of a gating pulse A111, in response to the present conditions of the pair control unit 141, which enables memory 111 to receive the contents of the program address register 104. Gating pulse A111 also causes the memory state flip-flop 145 to change state and activates the memory state counter 143. The logical "0" condition of memory state flip-flop 145 indicates that memory 112 is now the responsive memory. The response to address A111 is received by central control 101 prior to $T_0+½t$ as shown on line 9. The incrementing circuit 107 is operative prior to $T_0+½t$ to produce an address corresponding to the second pair of memories. A clock pulse at $T_0+½t$ causes pair control unit 142, in response to the present condition of its memory state flip-flop and memory state counters, to produce gating pulse A121 allowing the new address, as generated by the incrementing circuit 107, to enter memory 121. The gating pulse A121 changes the state of the memory state flip-flop of pair control unit 142 as indicated on line 5 and activates the memory state counter corresponding to memory 121 as shown on line 6. The clock pulse $T_0+½t$ also returns memory state counter 143 of pair control unit 141 to the logical "1" condition indicating that memory 111 is again accessible. The response to the address gated to memory 121 is returned to the central control prior to $T_0+t$ and during this time the incrementing circuit 107 has produced a second address for the first memory pair which is gated at $T_0+t$. Both memories 111 and 112 are available at $T_0+t$, but memory state flip-flop 145 indicates that memory 112 is the responsive memory of the first pair and, therefore, the address is gated into memory 112.

FIG. 2 shows the sequence of gating actions for advancing through a list of instructions until the memory 111 is again accessed. At clock pulse $T_0+2½t$, through interleaved operation, an address A121 is gated to memory 121. However, central control 101 has detected the response R111 as a transfer instruction. Central control 101 in response to this condition causes a countermand signal to be transmitted via conductor 196 which inhibits the reply of memory 121 to the last address as indicated by the dashed response indication just prior to $T_0+3t$. The transfer address, as is gated to the program address register 104 in response to the transfer condition, corresponds to the second memory pair and access is provided to memory 122 of the second pair in response to the condition of the memory state flip-flop of pair control unit 142. The memory response corresponding to the address to memory 122 is returned to the central control by $T_0+3½t$. If the redundant instruction list had not been provided, central control 101 would have waited until $T_0+4t$ for the response and thus lost an entire cycle.

My invention can also be used in conjunction with a data processor operating on instructions at a rate of one every ¼$t$ microseconds and still maintain the efficient operation described. In this illustration the words read from memory contain two data processor instructions. The system clock (not shown) transmits clock pulses via conductor 190 every ¼$t$ microseconds at which rate addresses can be transmitted to the memory system. AND-gate 133 is controlled by the control and logic unit 109 to allow clock pulses to be transmitted via conductor 191 every ½$t$ microseconds to control memory accessing for advancing through a list of instructions. The memory system is accessed at ½$t$ microsecond intervals, while advancing through a list of instructions, and the processor operates twice per access giving the memory system an apparent ¼$t$ microsecond cycle. The program control unit 150 of this embodiment is identical to that of the previous embodiment except that the memory state counters which correspond to each of the memories are now four-state counters. These counters are activated by the gating signal to their respective memories and count three subsequent ¼$t$ microsecond clock pulses before returning to the nonactivated state.

Figure 3:
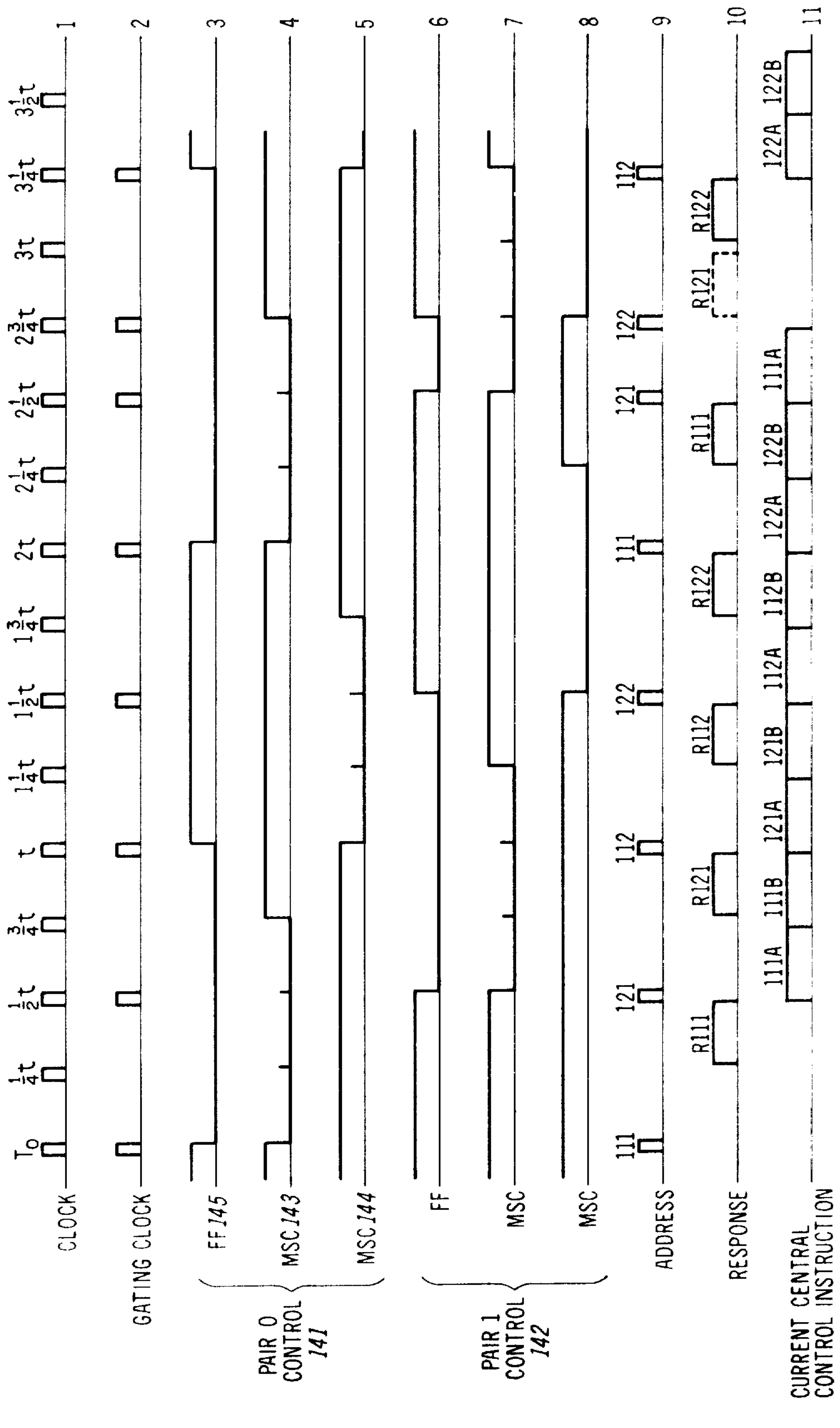
FIG. 3 is a timing diagram for a processor operating at four times the memory reaccess rate.

The operation of this system will be described with reference to FIG. 3 which is a timing diagram of the system operation at the ¼$t$ microsecond data processor cycle rate. The initial conditions which exist are the same as those which existed in the previous descriptions. A clock pulse at $T_0$ causes the program address register 104 contents to be gated to memory 111 which is indicated by A111 on the address line. The gating of this address causes memory state flip-flop 145 to change state and activates memory state counter 143. The memory state counters receive data processor clock pulses at ¼$t$ microsecond intervals from the central control clock (not shown) via conductor 190. The response from memory 111 arrives at central control 101 prior to $T_0+½t$. At $T_0+½t$ pair control unit 142 in response to an address, as produced by the incrementing circuit 107, and the present internal state of pair control unit 142, generates an enabling signal for memory 121. Starting at $T_0+½\ t$ central control 101 is operating in response to a first portion of the instruction word returned from memory 111. This is indicated on the line 11 of FIG. 3 by 111A. At $T_0+¾t$ central control 101 begins to operate under the control of the second portion of the instruction from memory 111 as indicated by 111B. Also, at $T_0+¾t$ the clock pulse 4 which is delivered to memory state counter 143 causes it to be reset indicating that memory 111 is now reaccessible. The interleaved operation continues, as in the description of FIG. 2, until the clock at $T_0+2t$ causes access to Memory 111. The response from this memory is received by central control prior to $T_0+2½t$ and at $T_0+2½t$ access is provided to memory 121 to continue the interleaved operation. The data processor begins operation on the first portion of the response from memory 111 at $T_0+2½t$. Prior to the clock at $T_0+2¾t$ this instruction is detected as a transfer, for which the transfer conditions are met, and central control is responsive to transmit a countermand pulse via conductor 196 causing the elimination of the response from memory R121. This elimination is indicated on line 10 by the dashed response signal R121. Also, in response to the transfer condition, the contents of the transfer address register 108 is gated to the program address register 104 and a signal is transmitted to AND-gate 133 to allow the clock pulse at $T_0+2½t$, to be gated to the output AND gates of the program control unit 150. The transfer address, as has been placed in the program address register 104, corresponds to memory pair 121 and 122 and the internal states of the pair control unit 142 provide access to memory 122. The response from this access is received by central control prior to $T_0+3¼t$ and operations begin on this response at $T_0+3¼t$. If the redundant set of instructions and the program control unit of my invention had not been provided, central control would have waited until a clock pulse at $T_0+3\frac{1}{2}t$. The response from this memory access would not have reached central control until just prior to $T_0+4t$ which would indicate that the data processor would have waited three cycles longer than is required with my invention.

When all of the elements of my invention are operable, the arrangements disclosed herein provide the previously noted functions and advantages. Additionally, certain maintenance features are included herein to provide security in the event of system failures. In the event that a memory should become unavailable through memory or circuitry failure, access to that memory can be inhibited and the other memory of the pair, in which the memory failed, can be permanently defined as the responsive memory. This feature is provided by means of an AND gate on the output of each of the memory state counters; e.g., AND-gates 131 and 132 and an OR gate on each of the outputs of the memory state flip-flop; e.g., OR-gates 136 and 137. As an example, if memory 111 is determined to be unavailable, by known means (not shown), a logical "0" signal is applied via conductor 195 to AND-gate 131 and inverting gate 134 the output of which is applied to OR-gate 137. This signal inhibits AND-gate 131 and thus applies a continuous logical "0" to the input of AND-gate 148 and a continuous logical "1" to the input of AND-gate 149 via OR-gate 137. In this state only memory 112 of the memory pair 111 and 112 can be accessed and access thereto is controlled by the memory state counter 144, the decoders 151 and 152 and the clock pulses via conductor 191.

Advancements through a list of instructions can still be performed at the same rate as before the memory failure and transfers can be accomplished as previously described within those memory pairs not having an unavailable memory. To provide for the occurrence of transfers within a memory pair having a faulty memory the control and logic unit 109 is conditioned to place new addresses in the program address register only after receiving verification that an access pulse has been delivered by one of the output AND gates; e.g., output AND-gates 148 and 149. This verification is provided by combining the gating pulses of all of the output AND gates in OR-gate 146 and returning the resulting signal to the control and logic unit 109.

As an example, memory 111 has been determined to be faulty and has been made unavailable as previously described. Thereafter, a memory access request for memory pair 111 and 112 will be gated to memory 112. If the next memory request is for the same memory pair, the memory state counter 144 is still in the active state, from the last access thereof, and a logical "0" is applied to output AND-gate 149. Therefore, when a clock pulse is transmitted to the output AND gates via conductor 191 access to memory 112 is inhibited and the output of OR-gate 146 remains a logical "0." In the absence of verification of a memory access the contents of the program address register 104 remains the same until after the memory state counter 144 returns to the nonactivated state. In the nonactivated state the memory state counter 144 applies a logical "1" to its input of the output AND-gate 149 and a gating pulse will be developed when the next clock pulse is transmitted to the output AND gates. This gating pulse will provide access to memory 112 and allow the control and logic unit 109 to place a new address in the program address register 104.

It is to be understood that the above-described embodiments are merely illustrative of the principles of the invention. Numerous modifications may be made therein and other arrangements may be devised without departing from the spirit and the scope of the invention. As an example, the memories can be arranged in a plurality of pairs with the addresses interleaved among the plurality to provide effective accessing rates of other integer fraction portions as those herein described.

What is claimed is:

1. A memory-accessing arrangement, for operation in conjunction with a data-processing unit, comprising:

a plurality of pairs of memories wherein one memory of each of said memory pairs contains an instruction set redundantly contained in the other memory of the same memory pair;

an address register;

addressing means for generating and transmitting addresses to said address register;

decoding means coupled to said address register, and responsive to the contents of said address register for generating decoder signals defining the one of said memory pairs to be accessed;

control means for generating address gating signals;

timing means coupled to said control means and responsive to said address gating signals for generating timing signals indicating the availability and nonavailability of each of said memories;

memory selection means, coupled to said control means, and responsive to said address-gating signals for generating selection signals indicating the memory of each of said memory pairs accessed the longest time in the past;

said control means being coupled to said decoding means, said timing means, and said memory selection means and responsive to said decoder signals, said timing signals, and said selection signals for generating said address-gating signals;

said address-gating signals define the one memory of said defined memory pair accessed the longest time in the past; and gating means coupled to said control means and responsive to said address-gating signals for transmitting the contents of said address register to said defined memory.

2. The combination in accordance with claim 1 wherein said addressing means comprises:

a first address generator for generating addresses corresponding consecutively to each pair of memories, the first of said memory pairs being addressed after the last of said memory pairs;

a second address generator for generating other addresses for said memory pairs; and address-transmitting means for selectively transmitting said addresses, from said first and said second address generators, to said address register.

3. The combination in accordance with claim 2 wherein said address-transmitting means comprises means, connected to said control means, for gating said addresses to said address register in response to said address-gating signals.

4. A memory-accessing arrangement, for operation in conjunction with a data processing unit, comprising:

a first and second pair of memories wherein one memory of each of said memory pairs contains an instruction set redundantly contained in the other memory of the same pair;

an address register;

addressing means for generating and transmitting addresses to said address register;

decoding means coupled to said address register and responsive to the contents of said address register for generating decoder signals defining the one of said memory pairs to be accessed;

a clock pulse generator for generating clock pulses defining fixed intervals of time;

control means for generating address-gating signals;

timing means, coupled to said control means, and responsive to said address-gating signals for generating timing signals indicating the availability and nonavailability of each of said memories;

memory selection means, coupled to said control means, and responsive to said address-gating signals for generating selection signals indicating the memory of each of said memory pairs accessed the longest time in the past;

said control means being coupled to said decoding means, said clock pulse generator, said timing means and said memory selection means and responsive to said decoder signals, said clock pulses, said timing signals and said selection signals for generating said address-gating signals;

said address-gating signals define the one memory of said defined memory pair accessed the longest time in the past; and gating means connected to said control means and responsive to said address-gating signals for transmitting the contents of said address register to said defined memory.

5. The combination in accordance with claim 4 wherein said memory selection means comprises two bistable devices each of said bistable devices being uniquely associated with one of said memory pairs;

each of said bistable devices changes state in response to each address-gating signal corresponding to the memory pair associated therewith to change state;

each of said bistable devices, in the first and the second state, being operative to generate signals defining the first and the second memories respectively, of the pair associated therewith, as having been accessed the longest time in the past; and wherein;

said timing means comprises four memory state counters each of said memory state counters being uniquely associated with one of said memories;

each of said memory state counters being activated in response to address-gating signals corresponding to the memory associated therewith and deactivated in response to a preset number of said clock pulses occurring after activation; and each of said memory state counters, in the activated and nonactivated state, generates signals indicating nonavailability and availability of the memory associated therewith respectively.

6. The combination in accordance with claim 4 wherein said addressing means comprises:

a first address generator for generating addresses corresponding alternately to said first and said second memory pairs;

a second address generator for generating other addresses for said first and said second memory pairs; and address-transmitting means for selectively transmitting said addresses, from said first and said second address generators, to said address register.

7. The combination in accordance with claim 6 wherein said address-transmitting means comprises means, connected to said control means, for gating said addresses to said address register in response to said address-gating signals.

8. The combination in accordance with claim 7 further comprising means for generating disable signals defining corresponding memories as being unaccessible; and wherein said control means comprises means, coupled to said disable signal generating means, and responsive to said disable signals for inhibiting the generation of address-gating signals corresponding to said unaccessible memories; and said control means further comprises means coupled to said disable signal generating means and responsive to said disable signal for generating signals indicating the other memory, of each memory pair containing an unaccessible memory, as the memory accessed the longest time in the past.

9. A memory-accessing arrangement, for operation in conjunction with a data-processing unit, comprising:

a plurality of groups of memories each of said groups comprising a first and a second memory pair wherein one memory of each of said memory pairs contains a set of information words redundantly contained in the other memory of the same pair;

an address register;

addressing means for generating and transmitting addresses to said address register;

a first decoding means coupled to said address register and responsive to a portion of the address contained therein for generating a first decoder signal defining one of the groups of memory pairs;

a second decoding means coupled to said address register and responsive to a portion of the address contained therein for generating a second decoder signal defining one of said memory pairs within said defined memory group for access;

a clock pulse generator for generating clock pulses defining fixed intervals of time;

control means for generating address-gating signals;

timing means, coupled to said control means, and responsive to said address-gating signals for generating timing signals indicating the availability and nonavailability of each of said memories;

memory selection means, coupled to said control means, and responsive to said address-gating signals for generating selection signals indicating the memory of each of said memory pairs accessed the longest time in the past;

said control means being connected to said first and said second decoding means, said clock pulse generator, said timing means and said memory selection means and responsive to said first and said second decoder signals, said clock pulses, said timing signals and said selection signals for generating said address-gating signals;

said address-gating signals define the one memory of said defined memory pair within said defined memory group accessed the longest time in the past;

gating means coupled to said control means and responsive to said address-gating signals for transmitting the contents of said address register to said defined memory.

10. The combination in accordance with claim 9 wherein:

within each of said groups of memories the set of information words of said first memory pair is interleaved with said set of information words of said second memory pair and each information word of said sets of information words is comprised of a plurality of instructions.

11. The combination in accordance with claim 9 wherein:

said memory selection means comprises a plurality of bistable devices, each of said bistable devices being uniquely associated with one of said memory pairs;

each of said bistable devices changes state in response each address-gating signal corresponding to the memory pair associated therewith to change state;

each of said bistable devices, in the first and the second state, being operative to generate signals defining the first and the second memories respectively, of the pair associated therewith, as having been accessed the longest time in the past; and wherein said timing means comprises a plurality of memory state counters each of said memory state counters being uniquely associated with one of said memories;

each of said memory state counters being activated in response to address-gating signals corresponding to the memory associated therewith and deactivated in response to a preset number of said clock pulses occurring after activation; and each of said memory state counters, in the activated and nonactivated state, generates signals indicating nonavailability and availability of the memory associated therewith respectively.

12. The combination in accordance with claim 9 wherein said addressing means comprises:

a first address generator for generating sequential addresses corresponding alternately to said first and said second memory pairs within each of said memory groups;

a second address generator for generating other addresses; and address-transmitting means for selectively gating addresses from said first and said second address generators to said address register.

13. The combination in accordance with claim 12 wherein said address-transmitting means comprises means connected to said control means for gating said addresses to said address register in response to said address-gating signals.

14. The combination in accordance with claim 13 further comprising:

means for generating disable signals defining corresponding memories as being unaccessible; and wherein said control means comprises means, coupled to said disable signal generating means, and responsive to said disable signals for inhibiting the generation of memory selection signals corresponding to said unaccessible memories; and said control means further comprises means, coupled to said disable signal generating means, and responsive to said disable signals for generating signals indicating the other memory, of each memory pair containing an unaccessible memory, as the memory accessed the longest time in the past.

15. A memory-accessing arrangement comprising;

two memories wherein both said memories contain the same information at the same addressable storage locations;

memory selection means, responsive to the accessing of the contents of an addressable location in either of said memories, for generating memory selection signals indicating the one of said memories accessed the longest time in the past;

means for generating address signals indicating addressable storage locations within said memories; and memory-accessing means responsive to said memory selection signals and said address signals, for accessing the contents of the addressable storage location identified by said address signals in said memory accessed the longest time in the past.

16. The memory-accessing arrangement of claim 15 further comprising;

an availability-indicating means associated with each of said memories and responsive to the accessing of its associated memory for selectively generating availability signals indicating said associated memory as being available or not available for access; wherein said memory-accessing means responds to said availability signals for each of said memories by controlling access to the memory associated with said availability signals.

17. The memory-accessing arrangement of claim 16 wherein each of said availability-indicating means, in response to the accessing of its associated memory, generates said availability signals indicating its associated memory as being not available for access only for a preset interval of time after each access to said associated memory.

18. A memory-accessing arrangement comprising;

a plurality of pairs of memories wherein both memories of each memory pair store the same information at the same addressable storage locations;

means for generating address signals indicating addressable storage locations within said pairs of memories;

means responsive to said address signals for generating decoder signals defining one memory pair of said plurality of memory pairs as the memory pair to be accessed;

memory selection means responsive to the accessing of the contents of an addressable storage location in any of said memories for generating memory selection signals indicating the one memory of each of said memory pairs accessed the longest time in the past; and means responsive to said address signals, said decoder signals, and said memory selection signals for accessing the contents of the addressable storage location indicated by said address signals in said memory accessed the longest time in the past of the memory pair defined by said decoder signals.

19. The memory-accessing arrangement of claim 18 further comprising;

an availability-indicating means associated with each of said memories and responsive to the accessing of its associated memory for selectively generating availability signals indicating said associated memory as being available or not available for access; wherein said memory-accessing means responds to said availability signals for each of said memories by controlling memory access to the memory associated with said availability signals.

20. The memory-accessing arrangement of claim 19 wherein each of said availability-indicating means, in response to the accessing of its associated memory, generates said availability signals indicating its associated memory as being not available for access only for a preset interval of time after each access to said associated memory.

* * * * *

UNITED STATES PATENT OFFICE
CERTIFICATE OF CORRECTION

Patent No. 3,629,842 Dated December 21, 1971

Inventor(s) Frank F. Taylor

It is certified that error appears in the above-identified patent and that said Letters Patent are hereby corrected as shown below:

On the front page, at the identification numeral [73], the abbreviation "N.Y." should read --N.J.--. In the column 2, at line 3, the term "na" should read --an--; at line 39, the word "therein" should read --wherein--; at line 50, after "112," insert --121,--; and at line 55, the word "for" should read --from--. In the column 3, at line 43, the word "course" should read --source--; and at line 44, the word "of" should read --in--. In the column 4, at line 42, the number "1" should read --"1's"--. In the column 5, at line 3, the term "state 143" should read --state counter 143--. In the claim 5 at line 12, after "wherein" delete ";". In the claim 11 at line 5, after "response" insert --to--.

Signed and sealed this 11th day of July 1972.

(SEAL)
Attest:

EDWARD M.FLETCHER, JR.
Attesting Officer

ROBERT GOTTSCHALK
Commissioner of Patents